(12) United States Patent
Jones et al.

(10) Patent No.: US 10,404,688 B2
(45) Date of Patent: Sep. 3, 2019

(54) METHOD AND APPARATUS FOR ENABLING CO-BROWSING OF THIRD PARTY WEBSITES

(71) Applicant: Glance Networks, Inc., Arlington, MA (US)

(72) Inventors: Ellis Oliver Jones, Newburyport, MA (US); Deborah Mendez, Arlington, MA (US); Richard L. Baker, Belmont, MA (US); Edward F. Hardebeck, Brookline, MA (US)

(73) Assignee: Glance Networks, Inc., Arlington, MA (US)

( * ) Notice: Subject to any disclaimer, the term of this patent is extended or adjusted under 35 U.S.C. 154(b) by 220 days.

(21) Appl. No.: 15/420,619

(22) Filed: Jan. 31, 2017

(65) Prior Publication Data

US 2018/0219849 A1  Aug. 2, 2018

(51) Int. Cl.
| | | |
|---|---|---|
| G06F 21/00 | (2013.01) | |
| H04L 29/06 | (2006.01) | |
| H04L 12/24 | (2006.01) | |
| H04L 29/08 | (2006.01) | |
| G06F 16/904 | (2019.01) | |

(52) U.S. Cl.
CPC .......... *H04L 63/083* (2013.01); *G06F 16/904* (2019.01); *H04L 29/08* (2013.01); *H04L 41/046* (2013.01); *H04L 63/101* (2013.01); *H04L 67/14* (2013.01); *H04L 67/20* (2013.01); *H04L 67/02* (2013.01)

(58) Field of Classification Search
CPC ............. G06F 17/30873; G06F 3/0484; G06F 17/2247; G06F 17/30991; G06F 2216/15
See application file for complete search history.

(56) References Cited

U.S. PATENT DOCUMENTS

| | | |
|---|---|---|
| 8,413,058 B1 | 4/2013 | Lewis et al. |
| 9,535,651 B2 | 1/2017 | Khalatian |
| 2008/0276183 A1 | 11/2008 | Siegrist et al. |
| 2010/0158236 A1 | 6/2010 | Chang et al. |
| 2014/0019534 A1* | 1/2014 | Handrigan ........ G06F 17/30873 709/204 |
| 2015/0067180 A1 | 3/2015 | Roy et al. |
| 2015/0067181 A1 | 3/2015 | Roy et al. |

(Continued)

OTHER PUBLICATIONS

International Search Report and Written Opinion dated Mar. 22, 2018, from related international application PCT/US2018/015812.

*Primary Examiner* — Ghazal B Shehni
(74) *Attorney, Agent, or Firm* — Anderson Gorecki LLP

(57) ABSTRACT

An agent providing customer support to visitors on a website can co-browse with the visitors as they interact with the website. The agent is provided with a list of authorized third-party domains. Upon selection of one of the authorized third-party domains, an invitation will be sent to the visitor to co-browse with the agent on the website in the unaffiliated third-party domain. Acceptance of the invitation causes a co-browse browser extension to be downloaded to the visitor's browser and redirects the visitor's browser to the website in the third-party domain. The co-browse browser extension contains co-browse script to replicate the DOM of the visitor's browser to the agent so that the agent can view the visitor's browser as the visitor interacts with the website in the third-party domain.

7 Claims, 10 Drawing Sheets

(56) References Cited

U.S. PATENT DOCUMENTS

2015/0149557 A1\* 5/2015 Mendez ............ G06F 17/30873
                                                          709/205
2015/0149916 A1   5/2015 Mendez et al.
2017/0013073 A1   1/2017 Mendez et al.

\* cited by examiner

METHOD AND APPARATUS FOR ENABLING CO-BROWSING OF THIRD PARTY WEBSITES

CROSS REFERENCE TO RELATED APPLICATIONS

None

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to communication sessions and, more particularly, to enabling co-browsing of third-party websites.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

In one aspect, a method of enabling co-browsing of third-party websites is provided. The method includes the steps of generating a co-browsing invitation by a co-browsing service, the co-browsing invitation including a co-browsing authentication tag and an object to receive an indication of acceptance by a recipient computer of the co-browsing invitation, and forwarding the co-browsing invitation to the recipient computer. The co-browsing authentication tag includes an authentication token, a hyperlink to a target website of the co-browsing invitation, a whitelist of authorized target websites, and a link to a co-browsing browser extension. The co-browsing browser extension is software that is installed directly into a browser at the recipient computer and not into an operating system controlling operation of the recipient computer, the co-browsing browser extension is certified by a company that created the browser, and the co-browsing browser extension contains script to capture a Document Object Model (DOM) of the browser when the browser loads a website included in the whitelist of authorized target websites.

In some implementations, the step of generating a co-browsing invitation is performed in response to an instruction from an agent.

In certain implementations, the step of generating a co-browsing invitation is performed in response to clicking on an object of a web page loaded in the browser of the recipient computer.

In some implementations, the script of the co-browsing browser extension will not capture, examine, manipulate, modify, or transmit the DOM of the browser when the browser loads a website not included in the whitelist of authorized target websites.

In certain implementations, the co-browsing browser extension is software that is automatically uninstalled when the co-browse session ends or when the browser is closed.

In some implementations, the co-browsing browser extension contains a token having a time to live which, upon expiration, prevents the co-browsing browser extension from operating.

In certain implementations, the authentication token is a cryptographically secure tamper resistant token, the method further comprising the step of passing the authentication token to the co-browsing service to authenticate the co-browsing invitation to the co-browsing service.

In some implementations, the co-browsing service is hosting a first co-browsing session for the recipient computer on a first website in a first domain during the steps of generating the co-browsing invitation and forwarding the co-browsing invitation to the recipient computer, the invitation being an invitation to participate in a second separate co-browsing session on a second website in a second domain or to extend the scope of the first co-browsing session to include the second website.

In another aspect, a method of enabling co-browsing of third-party websites is provided. The method includes receiving, by a recipient computer, a co-browsing invitation from a co-browsing service, the co-browsing invitation including a co-browsing authentication tag and an object to receive an indication of acceptance by a recipient computer of the co-browsing invitation, the co-browsing authentication tag includes an authentication token, a hyperlink to a target website of the co-browsing invitation, a whitelist of authorized target websites, and a link to a co-browsing browser extension. The method also includes receiving, by the object, the indication of acceptance, forwarding, by the recipient computer, the authentication token to an authentication service for verification; and if the authentication token is verified by the authentication service, downloading and installing the co-browsing browser extension into a browser at the recipient computer. The co-browsing browser extension is software that is installed directly into a browser at the recipient computer and not into an operating system controlling operation of the recipient computer, the co-browsing browser extension is certified by a company that created the browser, and the co-browsing browser extension contains script to capture a Document Object Model (DOM) of the browser when the browser loads a website included in the whitelist of authorized target websites.

In some implementations, the script of the co-browsing browser extension will not examine, manipulate, modify, or transmit the DOM of the browser when the browser loads a website not included in the whitelist of authorized target websites.

In certain implementations, the co-browsing browser extension is software that is automatically uninstalled becomes non-operational when the co-browse session ends or the browser is closed.

In some implementations, the authentication token is a cryptographically secure expiring token, and wherein the authentication service is a co-browsing service.

In certain implementations, the co-browsing browser extension is a certified software package signed by a company that created the browser at the recipient computer the method further comprising the step of downloading the co-browsing browser extension from the co-browsing service.

In some implementations, the co-browsing service is hosting a first co-browsing session for the recipient computer on a first website in a first domain during the steps of generating the co-browsing invitation and forwarding the co-browsing invitation to the recipient computer, the invitation being an invitation to participate in a second separate co-browsing session on a second website in a second domain or to extend the scope of the first co-browsing session to include the second website.

In certain implementations, the method further includes establishing, by a browser on the recipient computer, a first co-browsing session on a natively scripted website during the steps of receiving the co-browsing invitation and forwarding the authentication token, the natively scripted website including co-browse script that is downloaded into a browser of the recipient computer when the website is loaded by the browser, the co-browse script causing the recipient computer to forward a Document Object Model (DOM) describing the content displayed in the browser to the co-browse service.

In some implementations, the method further includes downloading and installing the co-browsing browser extension, the co-browsing browser extension containing script to capture a Document Object Model (DOM) of the browser when the browser loads a website that is not natively scripted with co-browse script; loading, by the browser, the target website; and establishing, by the browser, a second co-browsing session using the script of the co-browsing browser extension or extending the scope of the first co-browsing session to include the second website, the co-browsing browser extension causing the recipient computer to forward the DOM of the browser as the browser interacts with the target website.

In another aspect, a method of enabling co-browsing of third-party websites is provided. The method includes receiving, by an agent, a list of authorized domains from a co-browse service, engaging, by the agent, a visitor to a first website in a first domain, selecting, by the agent, a selected domain from the list of authorized domains, the selected domain specifying a third-party website in a domain outside the first domain, and forwarding, by the agent to the co-browse service, a request for the co-browse service to generate and transmit an invitation to the visitor requesting permission from the visitor to participate in a co-browse session of the third-party website and to download a browser extension to the visitor. The co-browsing browser extension is software that is installed directly into a browser at the recipient computer and not into an operating system controlling operation of the recipient computer, the co-browsing browser extension is certified by a company that created the browser, and the co-browsing browser extension contains script to capture a Document Object Model (DOM) of the browser when the browser loads a website included in the whitelist of authorized target websites.

In certain implementations, the step of engaging comprises receiving, by the agent from the co-browse service, DOM information describing the visitor's view of the first website in the first domain.

In some implementations, the method further includes receiving, by the agent from the co-browse service, DOM information describing the visitor's view of the third-party website.

In another aspect, a method of enabling co-browsing of third-party websites includes affiliating a set of third-party websites with a first website in a first domain, each of the third-party websites in the set of third-party websites residing in separate domains outside of the first domain. The method also includes forwarding a list of authorized domains to an agent providing customer support for the first website, the list of authorized domains including only third-party websites included in the set of third-party websites. The method also includes receiving a message from the agent, the message identifying one of the third-party websites and requesting that a co-browse session be established or extended with a visitor on the first website, in which the visitor's browser is redirected from the first website to the identified third-party website and on which a Document Object Model (DOM) of the visitor's browser of the identified third-party website will be captured and forwarded to the agent, and generating and transmitting an invitation to the visitor requesting permission from the visitor to participate in a co-browse session of the third-party website and to download a browser extension to the visitor. The co-browsing browser extension is software that is installed directly into a browser at the recipient computer and not into an operating system controlling operation of the recipient computer, the co-browsing browser extension is certified by a company that created the browser, and the co-browsing browser extension contains script to capture a Document Object Model (DOM) of the browser when the browser loads a website included in the whitelist of authorized target websites.

In some implementations, the method further includes the steps of establishing a first co-browsing session on which the DOM of the visitor browser showing the visitor's view of the first website is captured and forwarded to the agent, and establishing a second co-browsing session or extending the scope of an existing co-browsing session, on which the DOM of the visitor browser showing the visitor's view of the third-party website is captured and forwarded to the agent.

In another aspect, a method of establishing a co-browsing session includes initiating a first co-browsing session by a first browser, the first co-browsing session involving the transmission of a DOM of the first browser from the first browser to a second browser, and initiating a second concurrent related co-browsing session. The second co-browsing session includes launching a third browser at a proxy server, transmitting a DOM of the third browser from the proxy server to the second browser on a second co-browsing session, and performing screen capture operation at the proxy server to capture a screen view of the third browser and transmitting the screen view of the third browser to the first browser on a screen-sharing session. The third browser is launched on a computer not hosting the first browser or second browser.

In another aspect, a method of establishing concurrent related co-browsing sessions includes initiating a first co-browsing session by a first browser, the first co-browsing session involving the transmission of a DOM of the first browser from the first browser to a second browser and initiating a second concurrent related co-browsing session. The second co-browsing session includes launching a third browser at a replication server, and transmitting a DOM of the third browser from the third browser to both the first browser and second browser via at least one co-browse session joined by the first and second browsers. The third browser is launched on a computer not hosting the first browser or second browser.

In some implementations, the second co-browsing session comprises a co-browsing session from the third browser to the first browser and a co-browsing session from the third browser to the second browser, the co-browsing session from the third browser to the second browser implementing masking objects of a web page loaded in the third browser and the co-browsing session from the third browser to the second browser not implementing masking of the objects.

In another aspect, a method of establishing concurrent related co-browsing sessions includes initiating a first co-browsing session by a first browser, the first co-browsing session involving the transmission of first web page information from the first browser to a second browser, and initiating the second concurrent related co-browsing session by the second browser, the second co-browsing session involving the transmission of second web page information from the second browser to the first browser on a second co-browsing session in which the DOM of the second browser is replicated to the first browser.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
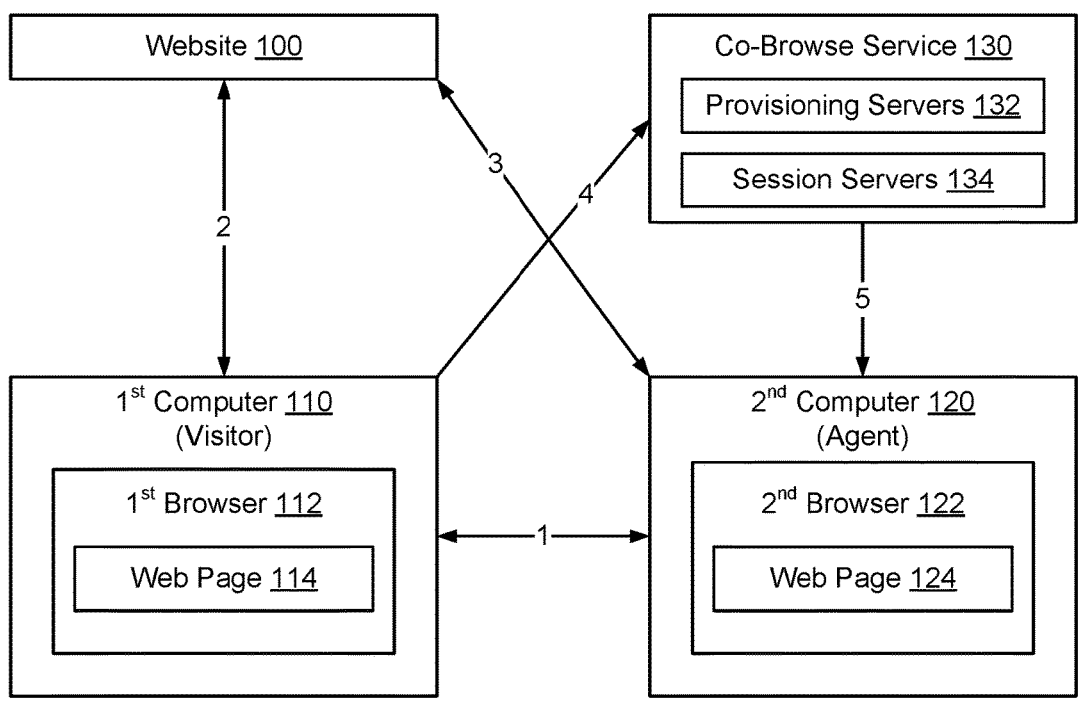
FIGS. 1-3 are functional block diagrams illustrating the flow of information between participants in a co-browsing system to enable co-browsing of a third-party website.

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

An agent providing customer support for a website may engage with a visitor to the website in multiple ways, such as by talking with the visitor on a voice or video telephone call, engaging the visitor in a text-based chat communication session, screen sharing with the visitor in which the agent views the visitor's screen or the visitor views the agent's screen, or co-browsing the website with the visitor in which the agent is able to view what the visitor sees on the website. Applicant recognized that there are instances where the agent might be able to provide enhanced customer service to the visitor by directing the visitor to another third-party website and co-browsing the third-party website with the visitor.

A third-party website, as used herein, is a website in a domain other than the domain that the agent has been hired to support. For example, in a hypothetical scenario a credit counseling company offers subscription based access to a credit counseling website. The website, in this hypothetical scenario, provides personalized information to visitors about how to improve their credit ratings and provides general financial advice. The credit counseling website, which might be website 100 in FIGS. 1 and 2, may be scripted with co-browse JavaScript so that agents providing customer support on the website 100 may be able to engage with visitors by co-browsing the website 100 with the visitors so that the agent can see the visitor's view of the website.

There are instance where the agent, who is helping a visitor, may find it useful to co-browse one or more other third-party websites. For example, in this hypothetical scenario, the agent who is engaging with the visitor may want to help the visitor obtain their yearly free credit report from a third-party website. Credit reports in the United States, for example, are available online at websites that are run by three major credit bureaus. There is no guarantee that these third-party websites will be instrumented with co-browse JavaScript and, even if the other domains were instrumented to enable co-browsing, it is possible that the co-browsing script at the credit bureau website would be crafted to enable co-browsing between visitors and credit bureau agents, rather than between the visitor and the agent for the credit counseling website.

As another example, a visitor to an investment brokerage web site could be co-browsing the brokerage firm website and looking to transfer money into their account from another brokerage firm. The agent, in this scenario, would like to be able to participate in a co-browse session of a third-party website with the visitor on which the other brokerage firm account could be viewed by both the agent and visitor to facilitate transfer of funds between the two brokerage firms.

As yet another example, a visitor to the website may be working on a tax return and receiving customer support from an agent on the site who is a tax professional. During the co-browsing session, the agent may find it advantageous to also have the visitor participate in a co-browse session to the United States Internal Revenue Service, one of the US state tax departments, or to a tax department of a country outside of the United States. There are thus many instances where it could be useful to enable the agent and visitor to participate in a co-browsing session of a third-party website.

FIG. 1 is a functional block diagram of a network based system for enabling co-browsing of third-party websites. As shown in FIG. 1, a visitor to a website 100, and an agent providing customer support for the website 100, are engaged in a communication session (arrow 1). The communication session may be a voice or video telephone call, a text-based chat or SMS communication session, a screen sharing session on which the agent views the visitor's screen or the visitor views the agent's screen, or a co-browsing session in which the visitor and agent are able to both see the same view of the website 100.

The visitor has a first computer 110 in which a first browser 112 is instantiated. The first browser 112 loads first web page 114 from website 100 (arrow 2). The agent has a second computer 120 in which a second browser 122 is instantiated. The second browser 122 optionally loads a second web page 124 from the website 100.

Where the visitor and agent are engaged in a co-browse session via a co-browse service 130 (arrows 4 and 5), the second web page 124 in the agent browser 122 displays the same information as first web page 114 in visitor's browser 112. Additional details about how co-browse sessions are established is described in U.S. Patent Application Publication No. 2015/0149557, filed Jan. 16, 2015, entitled Integrating Co-Browsing With Other Forms Of Communication Sharing, the content of which is hereby incorporated herein by reference. Additional details of integrating a co-browsing system with a presence system is described in U.S. patent application Ser. No. 15/270,258, filed Sep. 20, 2016, entitled Presence Enhanced Co-Browsing Customer Support, the content of which is hereby incorporated herein by reference.

Depending on the implementation, co-browse service 130 may be implemented as one or more servers 132, 134, configured to establish and handle co-browse sessions. In an embodiment, as shown in FIG. 1, the co-browse service 130 is implemented as one or more provisioning servers 132 to handle signaling in connection with allowing users to establish and join co-browse sessions. In this embodiment, the co-browse service 130 further includes one or more session servers 134 to handle transmission of data between participants on active co-browse sessions. In other implementations co-browsing sessions may extend directly between participants, e.g. between visitor computer 110 and agent computer 120, without implicating an intermediate co-browsing service 130.

Participants to a co-browse session, such as the visitor and agent, participate in an exchange with the provisioning server 132 to cause a co-browse session to be established, and data that is passed between the participants to the co-browse session is communicated through one of the co-browse session servers 134 assigned by the provisioning server 132 to handle data traffic on the co-browse session. In other implementations, both signaling and session functions may be handled by the same server. For convenience, the term "co-browse service" is used herein to refer to a collection of servers on the network configured to handle the signaling and session functions associated with establishing co-browse sessions and handling the transmission of data between co-browse session participants. The term "server", as used herein, may refer to both an internet host machine as well as a virtual machine instance running in the context an internet host machine such that multiple virtual machine instances may be instantiated on a given internet host machine.

Figure 2:
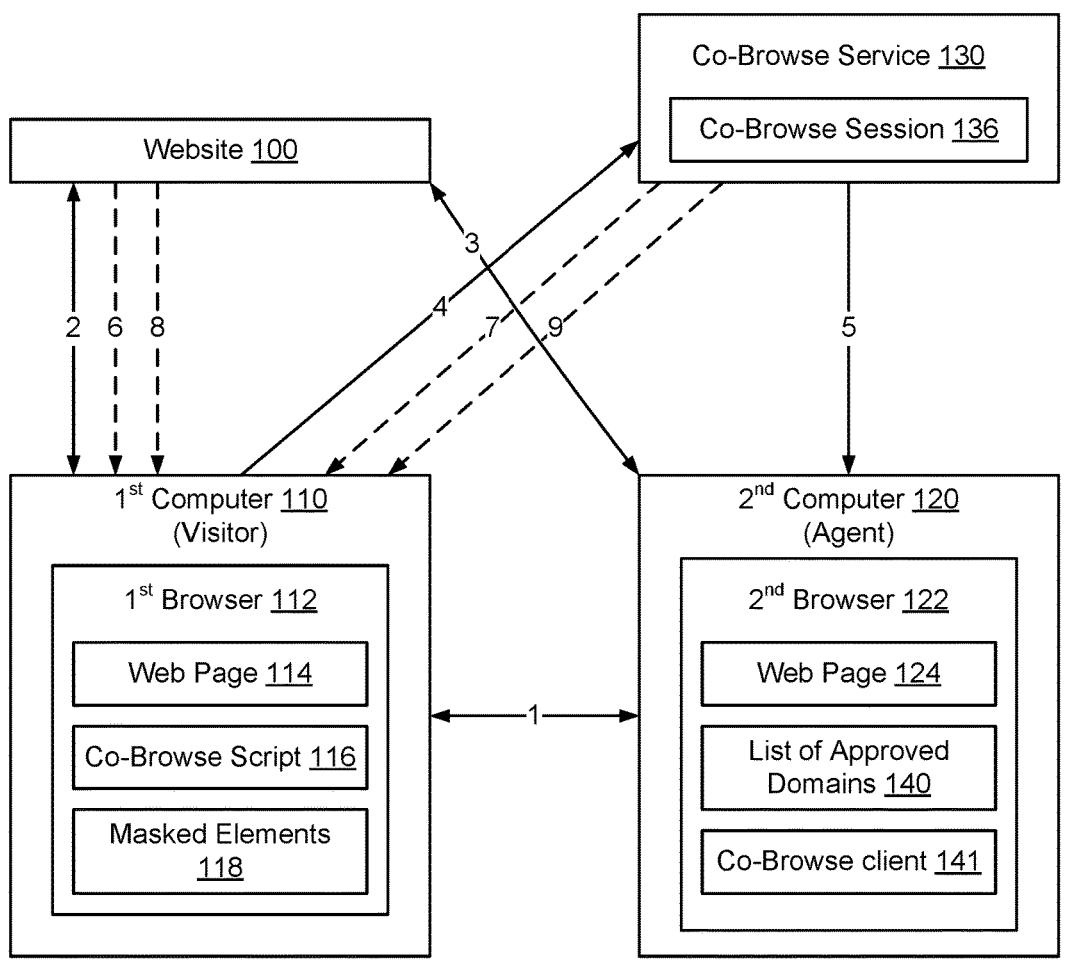

FIG. 2 shows additional details about the flow of information between participants of a co-browse session according to an implementation. As shown in FIG. 2, in one implementation when a visitor and agent are engaged in a co-browse session 136, the visitor loads web page 114 into first browser 112 from website 100.

Web page 114 is instrumented with co-browse script 116 (JavaScript in one embodiment), such instrumentation being made by, or with the cooperation of, the owner of Website 100. The co-browse script 116 obtains the original Document Object Model (DOM) of browser 112, and dynamic changes made to the DOM of browser 112, and forwards HTML describing the original DOM and subsequent changes to the DOM to the co-browse service 130 (arrow 4). The co-browse service 130 facilitates the co-browse session by relaying these updates to the second browser 122 (arrow 5). To cause the first browser 112 to provide these updates, the co-browse script 116 is downloaded to the first browser 112 either from the website 100, e.g. in connection with downloading web page 114 (arrow 6), or from the co-browse service 130 (arrow 7).

The second browser 122 downloads resources needed to render web page 124 from the website 100 (arrow 3) and other web sites on the Internet using HTML provided by the first browser 112 and forwarded by the co-browse service 130 on the co-browse session 136. In an implementation, the HTML describing web page 124 is obtained by the co-browse service 130 from the co-browse script 116 (arrow 4) and forwarded by the co-browse service 130 to the second browser 122 (arrow 5). The HTML may contain references to style sheets, images, fonts, etc., on the website 100 or on other websites on the Internet. The second browser 122 uses these URLs to obtain content to be displayed in web page 124 from the website 100 (arrow 3) and possibly resources from other websites on the Internet. Since the HTML of the web page 114 is provided to the second browser 122 from the first browser 112 on co-browse session 136, the web page 124 displayed by the second browser 122 will appear to be identical to web page 114 displayed on the first browser 112.

The visitor or the company employing the agent may not want the agent to see everything on the web page 114. For example, it may be desirable to prevent the agent from seeing the visitor's login information, credit card information, account information, medical records, or other sensitive information. To enable privacy, a list of masked web page elements 118 is also downloaded to the first browser 112. Like the co-browse script 116, the list of masked web page elements 118 may be downloaded from the website 100 (arrow 8) or may be downloaded from the co-browse service 130 (arrow 9). The list of masked web page elements 118 instructs the co-browse script 116 which HTML elements (e.g. which elements of the Document Object Model DOM) should not be transmitted on the co-browse session 136.

As shown in FIG. 2, the agent computer may have a co-browse client 141 and a list of approved domains 140. The co-browse client 141 may be a stand-alone client running on agent computer 120 that interacts with browser 122. Alternatively, co-browse client 141 may be run in the context of agent browser 122. Likewise, co-browse client 141 may in some implementations include a custom browser such that browser 122 in these implementations is run in the context of co-browse client 141. In some implementations the co-browse client enables the agent to participate in co-browse sessions and provides the agent with additional functionality exposed by the co-browse service. One of the functions exposed by the co-browse service, in an embodiment, is the ability of the agent to select a third-party website from the list of approved domains 140 and have the co-browse service 130 send a message to the visitor (arrow 9) inviting the visitor to participate in a co-browse session on the selected website and co-browse it with the agent at computer 120.

Figure 3:
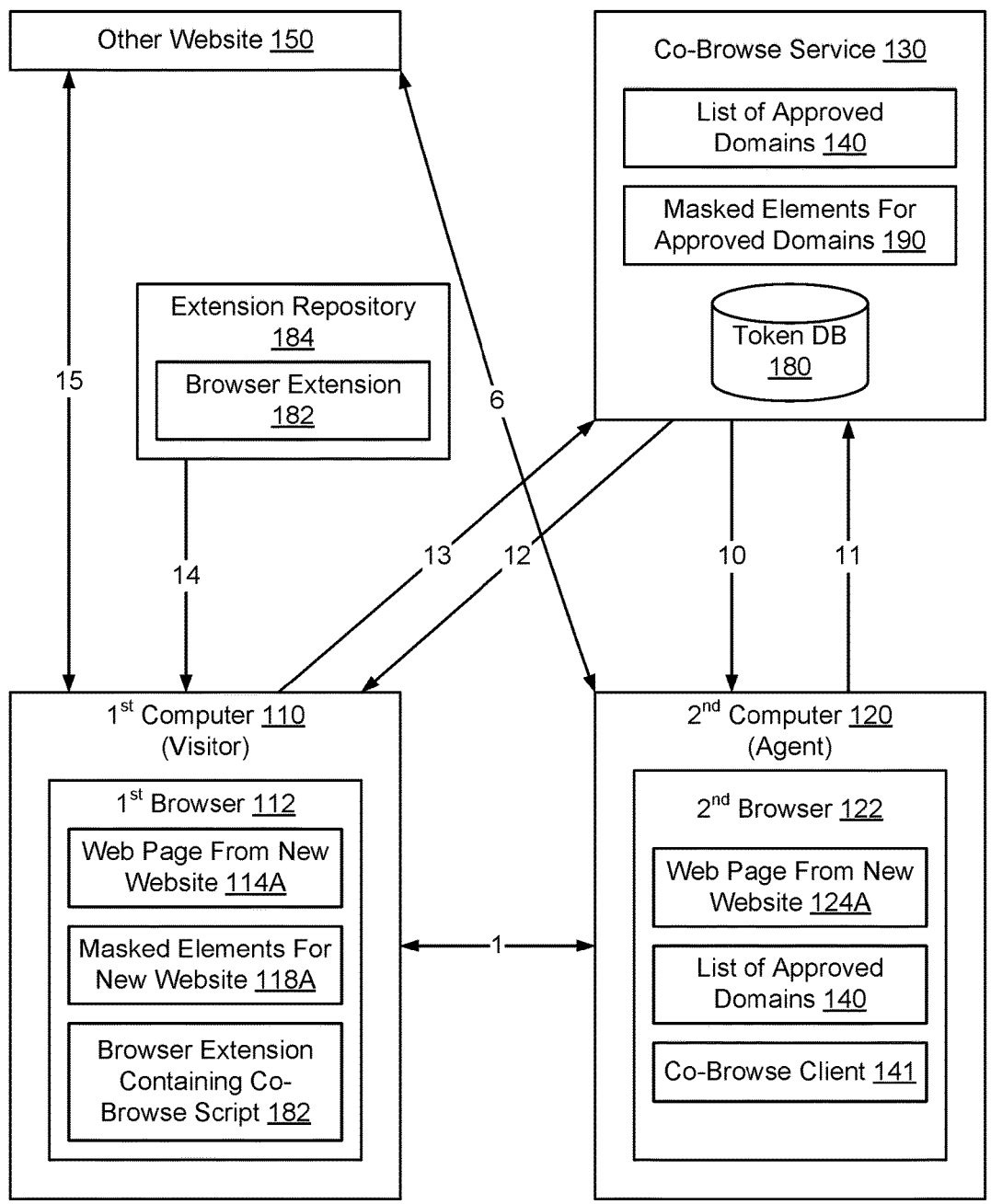
Figure 4:
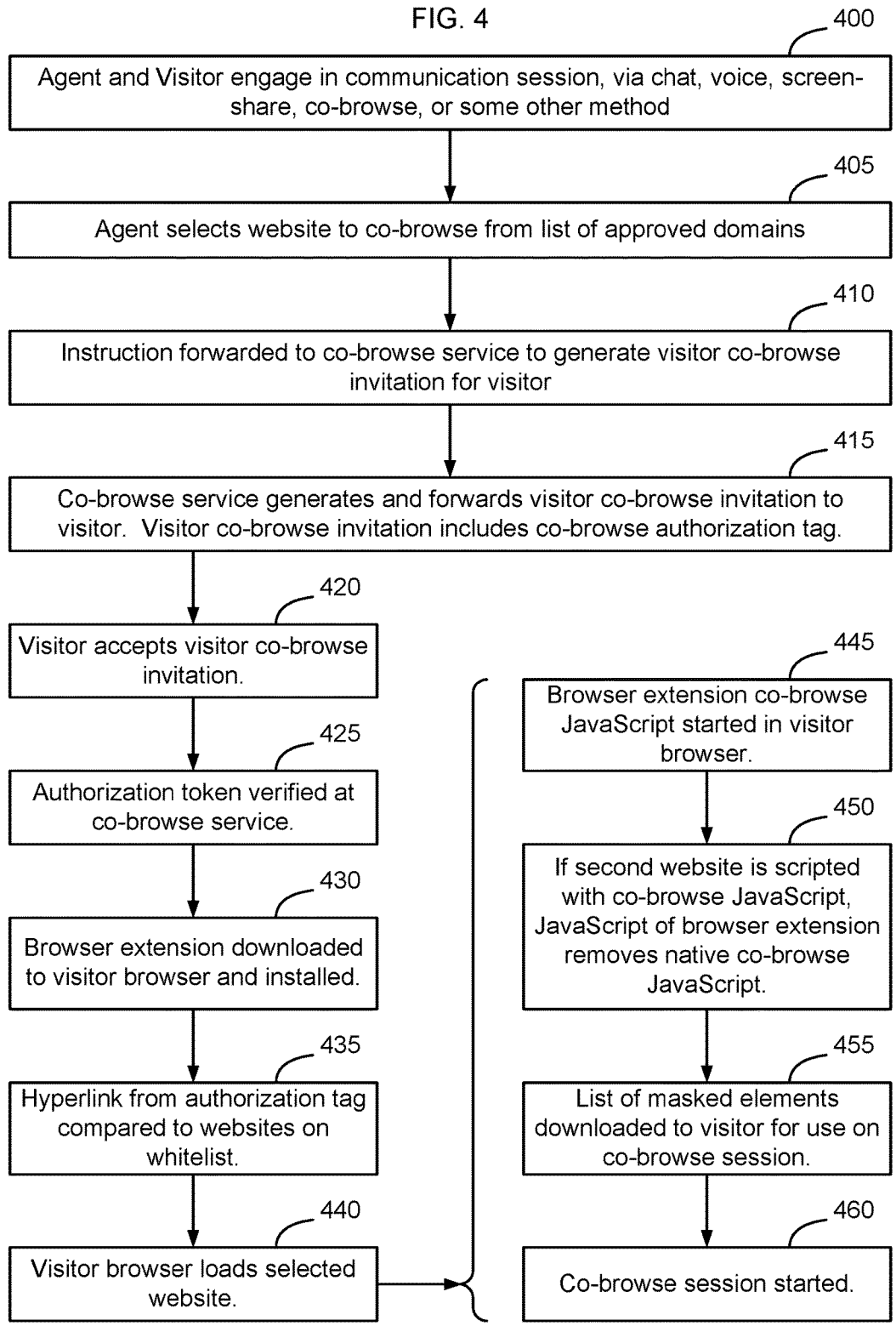
FIG. 4 is a flow chart of one implementation of enabling co-browsing of a third-party website.

FIG. 3 shows an implementation in which an agent is able to select from a list of approved third-party domains 140 to which the agent is authorized to participate in co-browse sessions with visitors. The phrase "participate in a co-browse session," as used herein, refers to both a scenario in which a new co-browse session is created or established between the visitor and agent to co-browse the new domain, and to the scenario in which an existing co-browse session between the visitor and agent is extended to co-browse the new domain. FIG. 4, discussed below, shows a flowchart of steps in a process of enabling co-browsing of third-party websites According to an implementation, as shown in FIG. 3, if an agent would like to participate in a co-browse session with the visitor in which a third-party website is to be viewed by both the visitor and the agent, the agent will select an available third-party website from a list of approved domains 140.

Figure 5:
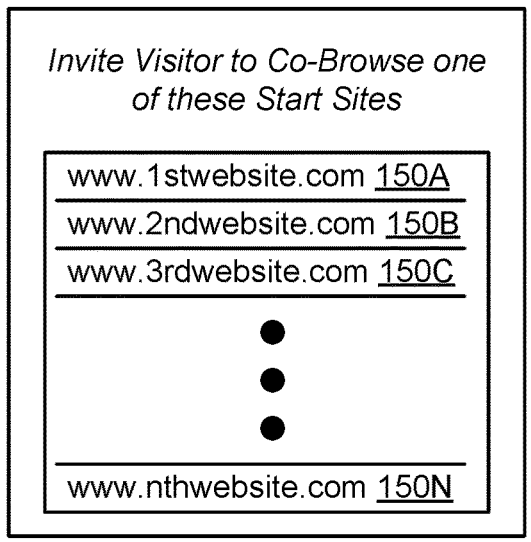
FIG. 5 is a graphical user interface object showing an example list of approved domains.

An example list of approved domains is shown in FIG. 5. The list of approved domains 140 is maintained by the co-browse service 130 and is downloaded from the co-browse service 130 to the browser 122 or co-browse client 141 (FIG. 3 arrow 10). The list of approved domains 140 contains a small list of other websites 150A-150N that website 100 will allow its agents to co-browse with visitors to the website 100. For example, the list of approved domains may be a list of third-party websites or web pages. In an implementation, the websites 150A-150N included in the list of approved domains 140 are added to the list by a system administrator for website 100 or another person authorized to control agents of the website 100 when provisioning website 100 for co-browsing via the co-browsing service 130. Upon selecting one of the approved domains from the list of approved domains 140, a message is posted (FIG. 3 arrow 11) to the co-browse service 130 to instruct the co-browse service to generate and transmit a co-browse invitation to the visitor (FIG. 3 arrow 12).

Figure 6:
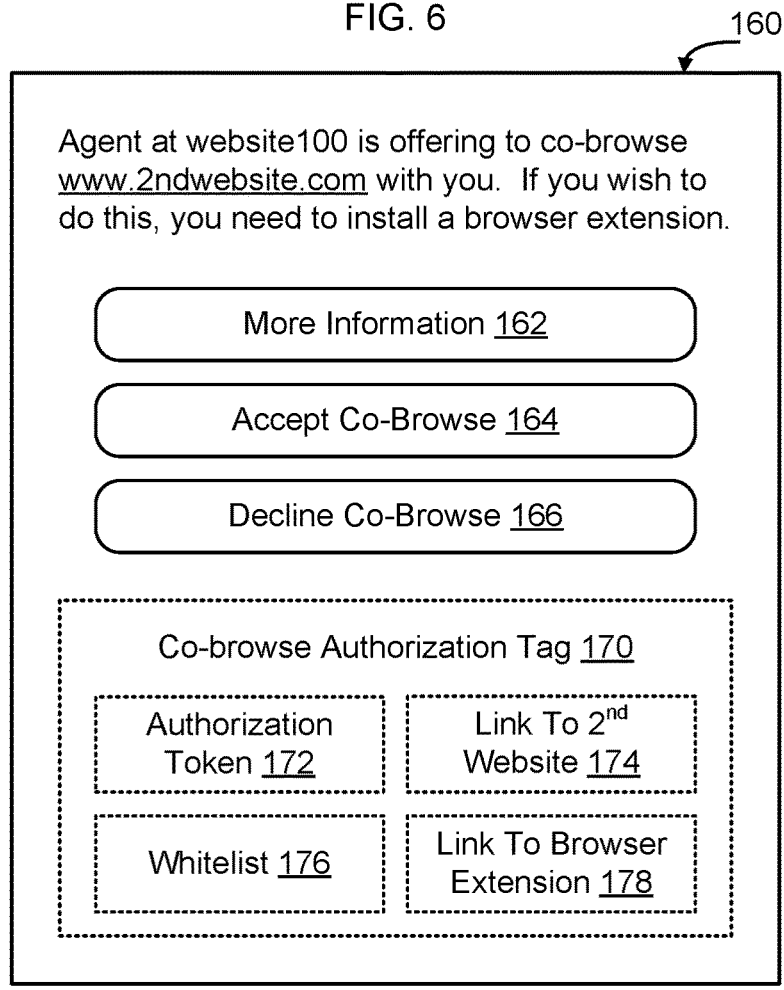
FIG. 6 is a graphical user interface object showing an example visitor co-browse invitation.

In one implementation, JavaScript running at the second browser 122 detects interaction by the agent with one of the links in the list of approved domains and posts the message (FIG. 3 arrow 11) to the co-browse service 130 to instruct the co-browse service to generate the visitor co-browse invitation 160 (FIG. 6). In another implementation, the co-browse client 141 posts the message to the co-browse service 130 to instruct the co-browse service to create and send the visitor co-browse invitation 160 (FIG. 3 arrow 12). The message (FIG. 3 arrow 11) in one implementation includes the identity of the selected third-party website and optionally other parameters, such as the agent ID and visitor ID.

One example implementation of a visitor co-browse invitation 160 is shown in FIG. 6. As shown in FIG. 6, the visitor co-browse invitation 160 may appear as a dialog box that appears over web page 114 in browser 112. The visitor co-browse invitation 160 includes one or more buttons to enable the visitor to interact with the visitor co-browse invitation 160. Example buttons may include a "more information" button 162, an "accept" button 164 and a "decline" button 166. Other interactive controls may likewise be included and different labels may be used for the buttons depending on the implementation.

In one implementation, if the visitor clicks on the accept button 164, the visitor's browser 112 will be redirected to open a new tab or window to the agent-selected third-party website 150 and a co-browse session will be started on which the visitor's view of the third-party website 150 will be visible to the agent. If the visitor clicks on the decline button 166, the visitor co-browse invitation will disappear and no co-browse session will start. If the visitor clicks on the more information button 162, additional information may be provided to the visitor about the other website 150, the browser extension that will be downloaded and installed into the visitor's browser, a description of a security policy, or other information deemed pertinent to the visitor when deciding whether to accept the visitor co-browse invitation 160.

Because accepting the visitor co-browse invitation 160 in some instances will result in the installation of a browser extension into the visitor's browser, for security purposes it is important to take steps to prevent the use of visitor co-browse invitations from providing a pathway for unauthorized individuals to take control of browser 112 or its underlying machine to compromise security.

In one implementation, as shown in FIG. 6, the visitor co-browse invitation 160 contains a co-browse authorization tag 170 containing a selection of data objects designed to increase security. In the implementation shown in FIG. 6 the data objects of the co-browse authorization tag 170 include an authentication token 172, a link 174 to the agent-selected third-party website 150, a whitelist 176 of websites that may be co-browsed with this browser extension, and a link 178 to the browser extension 182 in the browser's store. Although the visitor invitation shown in FIG. 6 shows the co-browse authorization tag 170 and its data objects 172-178 for purposes of discussion, it would be expected that the data objects 172-178 would be hidden properties of the visitor co-browse invitation 160 and not form visible elements of the user interface shown to the visitor. Accordingly, authorization tag 170 and its data objects 172-178 are shown using dashed lines in FIG. 6.

The authentication token 172, in one implementation, is a cryptographically secure (tamper-resistant) token that allows the co-browse session to begin. In this case "tamper-resistant" means "difficult to guess and valid only for a limited time period." In one implementation the authentication token 172 is generated by the co-browse service 130. When the visitor agrees to participate in the co-browse session and clicks on the accept button 164, a visitor response (FIG. 3 arrow 13) is sent to the co-browse service 130. The visitor response includes a copy of the authentication token 172 and is compared by the co-browse service 130 with a set of valid tokens in a token database 180. If the authentication token 172 is not valid, a co-browse session will not start, the visitor's browser will not be redirected to the third-party website 150, and the agent will not gain access to the contents of the third-party web site. Although in the implementation shown in FIG. 3 the co-browse service generates tokens and performs comparison of the tokens with a token database 180, a third-party service may be used to perform these functions as well.

The co-browse authorization tag 170 is also specific about the web properties authorized for third-party co-browsing in the specific co-browsing session. Specifically, as shown in FIG. 6, the co-browse authorization tag 170 includes a link 174 to a starting website that will be the initial target third-party website of the co-browse session if the visitor elects to accept the visitor co-browse invitation. When the visitor clicks on the accept co-browse button 164, after verifying the validity of the visitor co-browse invitation and installing browser extension, link 174 will be used by browser 112 load web page 114A of website 150 from the agent-selected third-party website (arrow 15).

The co-browse authorization tag 170 also includes a whitelist 176 of other websites that may be co-browsed using browser extension 182. The whitelist 176 will be used by the browser extension, described below, to limit the websites that will be scripted by the browser extension to limit co-browsing to only those sites listed in the whitelist 176.

The co-browse authorization tag 170 also includes a browser extension link 178 that is used to download and install a browser extension 182 into browser 112. The term "browser extension" as used herein, refers to a software component that is loaded into a browser to enhance the functionality of the browser. In an implementation, the browser extension 182 is certified by the company that created/sold browser 112. The browser extension 182 may be available at an extension repository 184 such as through a secure on-line store or other secure distribution mechanism associated with or certified by the company that created/sold browser 112. For example, in an implementation where the browser 112 is a Safari™ web browser available from Apple™, the browser extension 182 may be certified by and available through an on-line application store run by Apple™ By having the browser extension certified by the browser manufacturer, it is possible to ensure that the browser extension that is downloaded and installed into browser 112 originates at a verifiable source.

The term "browser extension" as that term is used herein, refers to software that is installed directly into the browser software. The term "plug-in" is used to refer to software that is installed into the operating system of the machine running the browser. While both types of software may alter the capabilities of a browser as the browser interacts with a web page, a browser extension interacts only with the browser itself rather than with the underlying operating system. By having the extension installed directly in the browser, the browser and the machine hosting it present a smaller and more controlled attack surface than a plug-in does, so the risk of an unauthorized individual compromising the security of the browser or its underlying machine is reduced for extensions, as compared to plug-ins.

In FIG. 3, the browser extension link 178 references browser extension 182 in extension repository 184. When the viewer clicks on the accept co-browse button 164, the browser 112 will download (arrow 14) and install browser extension 182 from extension repository 184 which, as mentioned above, in one implementation is a secure site operated by the manufacturer of the browser 112. In another implementation, the extension repository 184, e.g. the extension store, certifies the extension and cryptographically signs extension packages. These cryptographically signed extension packages are then provided to the co-browse service so that visitors can download the browser extension 182 from the co-browse service rather than from an external third-party extension repository 184.

Browser extensions 182 are specific to the type of browser. For example, a different browser extension 182 would be used for a Safari browser than would be used with a Firefox™ browser. In an instance where the visitor and agent are engaged in a co-browse session before the agent selects a website 150 from the list of approved domains 140, the co-browse service 130 will know the type of browser 112 in use at the first computer 110 and create a co-browse authorization tag 170 containing a link 178 to a browser extension 182 specific to that type of browser. In a situation where the visitor and agent are not previously engaged in a co-browse session, co-browse service uses information provided in the first request, (FIG. 3) arrow 13, from browser 112 to determine the capabilities of computer 110 and browser 112, and present an appropriate type of browser extension 182.

In another implementation, the invitation contains links to multiple types of browser extensions and the browser selects the correct link based on the type of browser in use at the visitor. Optionally, one of the links may reference the co-browse service to instruct the co-browse service that the browser type does not support extensions so that the co-browse service can cause the co-browse session to be implemented via a proxy service (FIGS. 7-8), replication service (FIG. 9), by the agent (FIG. 10) or in another manner. In either scenario the co-browse service will choose an alternate way of establishing the co-browse session if the co-browse service determines that browser 112 or its host computer 110 cannot support co-browsing using a browser extension.

The browser extension, in one implementation, is written in JavaScript and, when installed in browser 112, instruments each page downloaded from website 150 (FIG. 7) to browser 112 with co-browse JavaScript to cause browser 112 to forward DOM information of web page 114A, when loaded in browser 112, to co-browse service 130 as described in greater detail above. Specifically, the JavaScript 116 in browser extension 182 obtains changes to the DOM of browser 112 when browser 112 loads web page 114A from website 150 and forwards the HTML describing the original DOM and changes to the DOM to the co-browse service as described in greater detail in U.S. Patent Application Publication No. 2015/0149557, filed Jan. 16, 2015, entitled Integrating Co-Browsing With Other Forms Of Communication Sharing, the content of which is hereby incorporated herein by reference.

By providing the co-browse JavaScript in a browser extension, co-browsing of website 150 can occur without requiring website 150 be natively instrumented with co-browse JavaScript. Since the co-browse JavaScript is installed into the first browser 112 as a browser extension, the browser's restrictions on injecting JavaScript into a third-party website may be circumvented to enable co-browsing of website 150 without obtaining permission to modify the HTML or other content of website 150.

In one implementation, the browser extension 182 is designed to only allow co-browsing a particular set of domains. This is implemented, for example, using a whitelist containing the URLs of sites on which the browser extension will work. In one implementation, the browser extension 182 itself includes a whitelist of approved domains similar to whitelist 176. Since the browser extension is certified by the browser manufacturer and downloadable through the browser manufacturer's online portal, including a whitelist in the browser extension makes it harder to dynamically change the set of domains in which the browser extension will work. In another implementation, browser extension 182 reads whitelist 176 and will only enable use of JavaScript in browser extension 182 to co-browse websites included in whitelist 176. In another implementation, browser extension 182 includes a list of approved domains and also reads whitelist 176 to generate a list of websites where JavaScript in the browser extension 182 will function to facilitate co-browsing.

In one implementation, the whitelist 176 is created by a person affiliated with website 100 with administrative authority on website 100's account at the co-browse service 130. For example, a customer support company or the owner of the website 100 will have an account with the co-browse service that allows agents to use co-browse sessions in connection with performing customer support. In one implementation, the co-browse service enables an administrator of the website company's account to establish the list of approved domains 140 at the co-browse service and also establish the whitelist 176. The list of approved domains 140 and the domains included in the whitelist may be the same or may contain overlapping sets of domains depending on the implementation. Once the list of approved domains 140 and whitelist 176 have been established for the account, it will be passed to the agents on the account and used in connection with generating/transmitting/authorizing visitor co-browse invitations 160.

Although an example has been provided in which there is a single list of approved domains 140 per account, it should be understood that multiple separate lists of approved domains 140 may be created for a given account and/or according to the needs and training of each individual agent. For example, a given account may divide agents into working groups and separate lists of approved domains may be created for each of the agent working groups. Likewise, the list of approved domains that an agent can use to start a third-party co-browse session may vary based on where the visitor is located within website 100.

In one implementation, a separate masked elements list 190 is created for each website 150A-150N in the list of approved domains 140. The masked elements lists 190 may be provided to the co-browse service by the account administrator or may be created on behalf of the account by the co-browse service. In another implementation, a separate masked elements list may be created for each website in the whitelist 176.

Although an implementation has been described in which whitelists are used to limit the scope of utility of the browser extension, black lists or rules based algorithms may also be used.

As shown in FIG. 6, the co-browse authorization tag 170 includes both a link 174 to the second website and a link 178 to browser extension 182. In one implementation, when the visitor clicks on the accept co-browse button 164, the visitor co-browse invitation first activates the link 178 to the browser extension 182 to cause browser extension 182 to be downloaded and installed into browser 112.

According to the mandatory security policy of many browsers, initiating download of a browser extension will cause a confirmation dialog to pop to obtain a second level of user consent. Where the agent and visitor are presently co-browsing the first website 100, this consent dialog won't affect the DOM of the first web page 114 in browser 112 and hence will not be visible to the agent. Optionally, a facsimile of the confirmation dialog may be created locally by the agent co-browser client 141 to make the agent's screen appear similar to what the visitor is seeing so that the agent can guide the visitor. Once the appropriate consent has been received from the visitor, the browser extension 182 will be installed into the browser 112. Installing the browser extension 182 causes the page shown in the dialog associated with visitor co-browse invitation 160 to initiate hyperlink 174 to load web page 114A into browser 112.

By examining the collective data contained in the authentication token 172, link 174, whitelist 176, and link 178 to browser extension 182, the co-browse authorization tag 170 is able to ensure that the invitation originated at the co-browse service, that it redirects browser 112 only to the specific website selected by the agent, that the browser extension 182 is used only to co-browse websites from a list of previously selected and approved domains, and that the invitation is associated with a particular browser extension 182 designed only to inject co-browsing script into the website rather than some other script. This combination provides a user experience that is straightforward for the visitor, involving only one or two clicks, while also enabling robust security to prevent forged invitations from installing unauthorized co-browse scripts or other browser extensions into browser 112.

Some of the websites in the list of approved domains 140 may have native co-browse JavaScript from the co-browse service 130 already installed in the web page 114A. In one implementation, the script of the co-browse browser extension 182 inactivates or removes the native co-browse JavaScript from the copy of web page 114A loaded into browser 112 and substitutes native JavaScript with the co-browse JavaScript of the browser extension. This enables the agent to control the co-browse session with the visitor, for example by restricting the co-browse session to the properties included in the whitelist 176. This also prevents agents associated with a third-party site from participating in this particular co-browse session. In some implementations the co-browse browser extension 182 inactivates or removes native co-browse JavaScript from all co-browse vendors. In other implementations the co-browse browser extension 182 inactivates or removes native co-browse JavaScript only from the co-browse service 130 to prevent multiple instances of co-browse script from co-browse service 130 from simultaneously running on web page 114A.

As noted above, an agent may cause the co-browse service to issue a visitor co-browse invitation by selecting a third-party website 150 from a list of approved domains 140. The original website 100 may also include tags, placed there by the owner of original website 100. In an implementation, selection of one of the tags by a visitor will cause the co-browse service to generate and forward a visitor co-browse invitation 160. For example, website 100 may include a link to website 150 or may include the list of approved domains 140 and, when the visitor clicks on the link to the website 150 or on one of the entries in the list of approved domains 140, the tag causes co-browse service 130 to generate visitor co-browse invitation 160. In this implementation, the co-browse script 116 downloaded from the co-browse service 130 into website 100 (FIG. 2) detects hyperlinks in the website 100 to other websites on approved domains 140, and intercepts their operation to cause co-browse service 130 to generate and forward a visitor co-browse invitation 160 whenever one of the links to an approved site is selected.

Embedding tags in the website 100 allows the visitor to initiate co-browsing to a third-party site. For example, consider the case where the visitor is previously communicating with an agent, the agent will be notified of the existence of the co-browse session. If the visitor is not previously communicating with an agent, activation of the tag may start a communication session between the visitor and agent or prompt an agent to engage the visitor to initiate a communication session with the visitor as well as notify the agent of the existence of the co-browse session.

Most browsers, in most environments, provide extension technology, although some browsers, notably Microsoft Internet Explorer, do not. Likewise, some institutional environments prohibit by policy the use of browser extensions even when browsers provide the technology. Assuming browser extensions can be used, according to an implementation, the visitor co-browse invitation 160 installs the browser extension 182 (FIG. 3 arrow 14) with a single click on an object in the visitor co-browse invitation such as the accept co-browse button 164. The visitor co-browse invitation is validated after the visitor has clicked to accept installation of the browser extension 164 to ensure that the visitor co-browse invitation is authenticated by the co-browse service. If the co-browse authorization tag 170 is not present or not valid the browser extension 182 automatically uninstalls itself from browser 112.

After the browser extension 182 is installed in browser 112, the browser 112 loads second web page 114A from website 150 (FIG. 3 arrow 15). Co-browse script from browser extension 182 that is installed in browser 112 inspects the DOM of web page 114A, and automatically inserts the appropriate co-browse tags into the main web page 114A and any iFramed content from web properties that appear in whitelist 176. This operation also replaces any manual tagging of web page 114A that may have been done by owners of website 150. In one implementation, the co-browse script from browser extension 182 makes a decision using rules set by the customer as to whether it should replace original tags already present in the web page 114A when those tags already belong to the same customer of the co-browse service.

Optionally, the browser extension may be configured to automatically uninstall from browser 112 when the session ends, once the browser is closed, or if the browser is redirected to a website not included in the whitelist 176, or some time period after one of those events occur. Uninstallation may be implemented, in one implementation, by having the extension remove itself from the list of extensions in the visitor's browser. The possibility of having the browser extension 182 automatically uninstall when the browser is closed or when the browser is redirected may depend on the type of browser. For example, currently Google Chrome allows automatic uninstallation of browser extensions while other browser types may not allow this operation. If the extension is not able to uninstall, in one implementation the extension includes a token that has a time to live which will prevent the extension from being used shortly after the end of the session. The token time to live value is reset while the extension is in use to prevent the token from expiring while the visitor is in a co-browse session, but once the session ends the token will expire thus preventing the extension from use at a later period in time.

In one implementation, if a browser is in an active co-browse session, in which the DOM of the browser and updates to the DOM are being transmitted from the browser to the co-browse service, the co-browse JavaScript inserts a control object such as a button into the browser to enable the user to end the co-browse session. Clicking on the button will cause the co-browse JavaScript to end the co-browse session and stop sending DOM change updates to the co-browse service. Optionally, where multiple co-browse sessions are active from the browser, clicking on the button to end the co-browse session in one co-browse session will cause all related active co-browse sessions to end. For example, if the visitor and agent are engaged in a first co-browse session of a first website and a second related co-browse session is created to co-browse a third-party website, ending the first co-browse session in one implementation will also cause the second related co-browse session to end.

FIG. 4 shows a flowchart of steps in a process of enabling co-browsing of third-party websites. As shown in FIG. 4, optionally initially an agent providing customer support to a website and a visitor to the website will engage in a communication session. The communication session may be a chat session, voice session, screen sharing session, co-browse session of the website 100, or some other method (400). Although FIG. 4 shows the agent and visitor engaged in a prior communication session, this step is optional. For example, the website 100 may include a link to initiate customer support with a website agent and concurrently move to an unaffiliated website. As an example, the website 100 may include a first button by which the visitor may request customer support, a link to an unaffiliated website, and a button that would provide both functions at the same time, e.g. a button that states "click here to go to browse website #2 with a customer service agent." In this scenario the visitor and agent may be not previously engaged in a communication session and, hence, block 400 may be optionally not performed in particular circumstances.

In a situation where the visitor and agent are communicating, the agent or optionally the visitor will select a website to co-browse with the visitor from a list of approved domains (405). Upon selecting the website from the list of approved domains, an instruction is sent to the co-browse service to generate a visitor co-browse invitation (410). Where the agent selects the website, the instruction is sent from the agent to the co-browse service. Where the visitor selects the website, such as by clicking on an object (link) in the web page, the instruction is sent from the visitor to the co-browse service. In one implementation a co-browse client running at the agent includes the list of approved domains and a user interface through which the agent can select one of the websites in the list of approved domains. The agent co-browse client also contains code, JavaScript in one implementation, to forward the instruction to the co-browse service to instruct the co-browse service of the selected website and to instruct the co-browse service to generate the visitor co-browse invitation.

The co-browse service generates the visitor co-browse invitation and forwards the visitor co-browse invitation to the visitor. The visitor co-browse invitation includes the co-browse authorization tag 170 described in greater detail above (415).

If the visitor accepts the visitor co-browse invitation (420), the authentication token 172 from the authorization tag 170 is verified at the co-browse service 130 (425). If the authentication token 172 is valid, a browser extension is offered to the visitor. When the visitor accepts the extension, it is downloaded to the visitor's browser and installed. (430). In one implementation the browser extension uses the whitelist to limit the browser extension to only adding co-browse script to websites on the whitelist. Specifically, the browser extension is configured such that if a page from a website on the whitelist is loaded into the browser 112 the web page will be scripted with co-browse JavaScript to enable a co-browse session to occur while the browser has that website loaded. However, if a web page is loaded into the browser from a website that is not on the whitelist, the browser extension will not inject the co-browse script into the page, so a co-browse session with that website will not be possible using the browser extension.

Once the browser extension has been loaded into browser 112, the hyperlink from the authorization tag will be used load the selected website #2 into the browser (440). In connection with loading website #2, the website may be compared to the websites in the whitelist to determine whether the browser extension should script the website to enable co-browsing of website #2 (435).

If a co-browse session is to occur, the browser extension co-browse JavaScript is used to script the website in visitor browser 112 (445). In connection with this, the browser extension will determine whether the website #2 is already natively scripted with other co-browse JavaScript. If so, the browser extension will remove the other co-browse JavaScript and inject the co-browse JavaScript from the browser extension, in such a way that it disables or overrides the other cobrowse JavaScript (450). In connection with the co-browse session a list of masked web page elements for website #2 will be downloaded to the visitor browser 112 for use by the browser extension during the co-browse session (455). In an implementation, the co-browse session thus starts and the agent is able to view the website #2 in common with the visitor, even though website #2 may not have natively been scripted with co-browse JavaScript and even though the agent is not affiliated with or authorized to provide customer support to visitors to website #2 (460). In another implementation, where the agent and visitor are presently co-browsing together on the website 100, the existing co-browse session may be extended to include website #2.

Some makes and versions of browsers do not allow browser extensions to be downloaded and installed. For example, many mobile browsers today and some versions of Microsoft™ Internet Explorer™ lack support for extensions. Likewise, although a browser might support extensions, such as Microsoft Edge™, the extension might not be available because it is awaiting approval by Microsoft or the Microsoft store has not yet opened for business.

Figure 9:
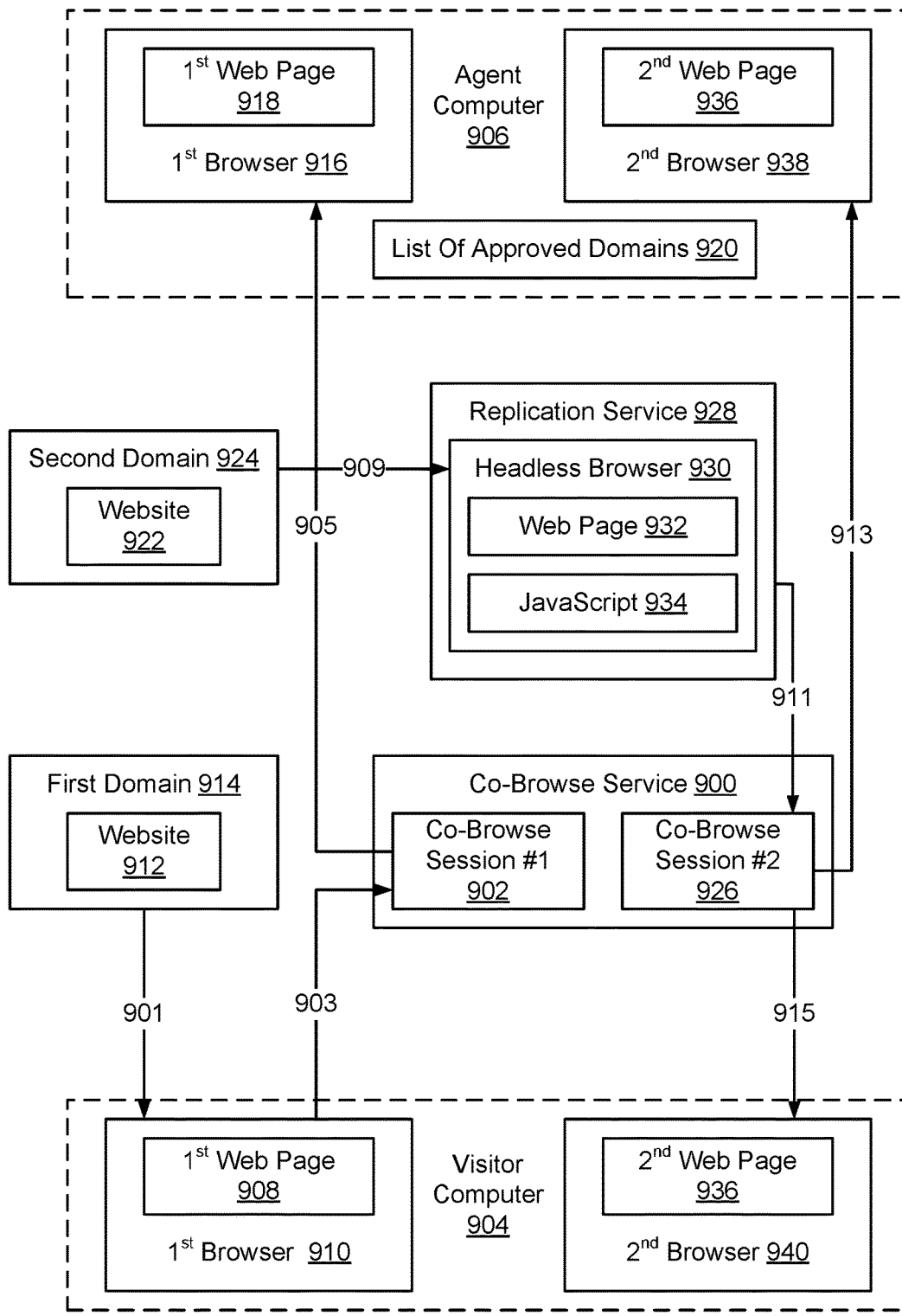
FIGS. 9 and 10 are a functional block diagrams illustrating the flow of information between participants to a co-browsing system to enable co-browsing of a third-party website using a replication service hosted co-browse session of the third-party website.
Figure 10:
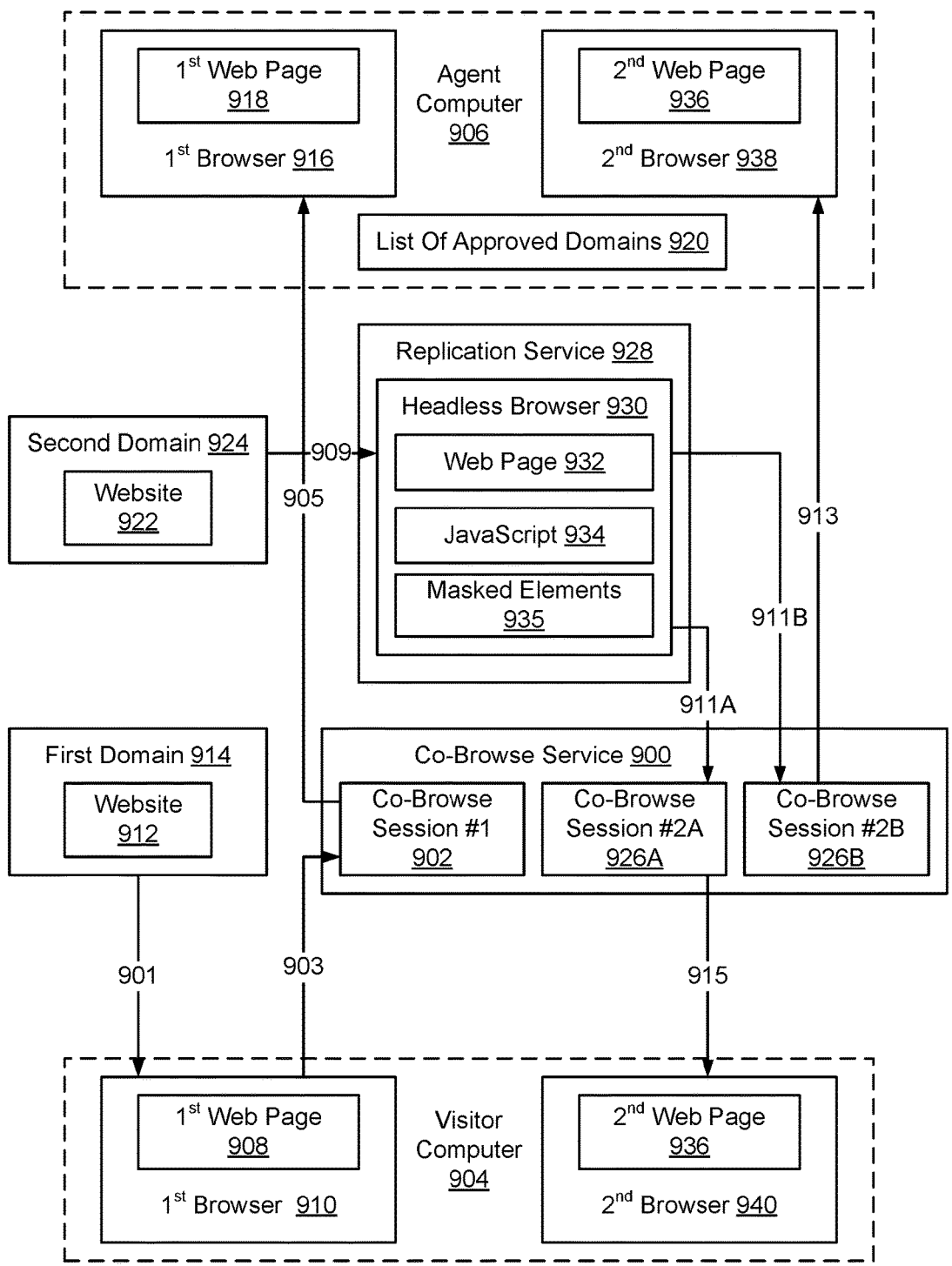

If the visitor's browser does not support browser extensions, in one implementation, acceptance of a visitor co-browse invitation 160 causes a co-browse session to be established via a proxy service (FIGS. 7-8), via a replication service (FIG. 9), or via a co-browse session hosted by the agent (FIG. 10). The co-browse service dynamically selects one of these alternate methods when the browser in use by the visitor is incompatible with browser extensions.

Figure 7:
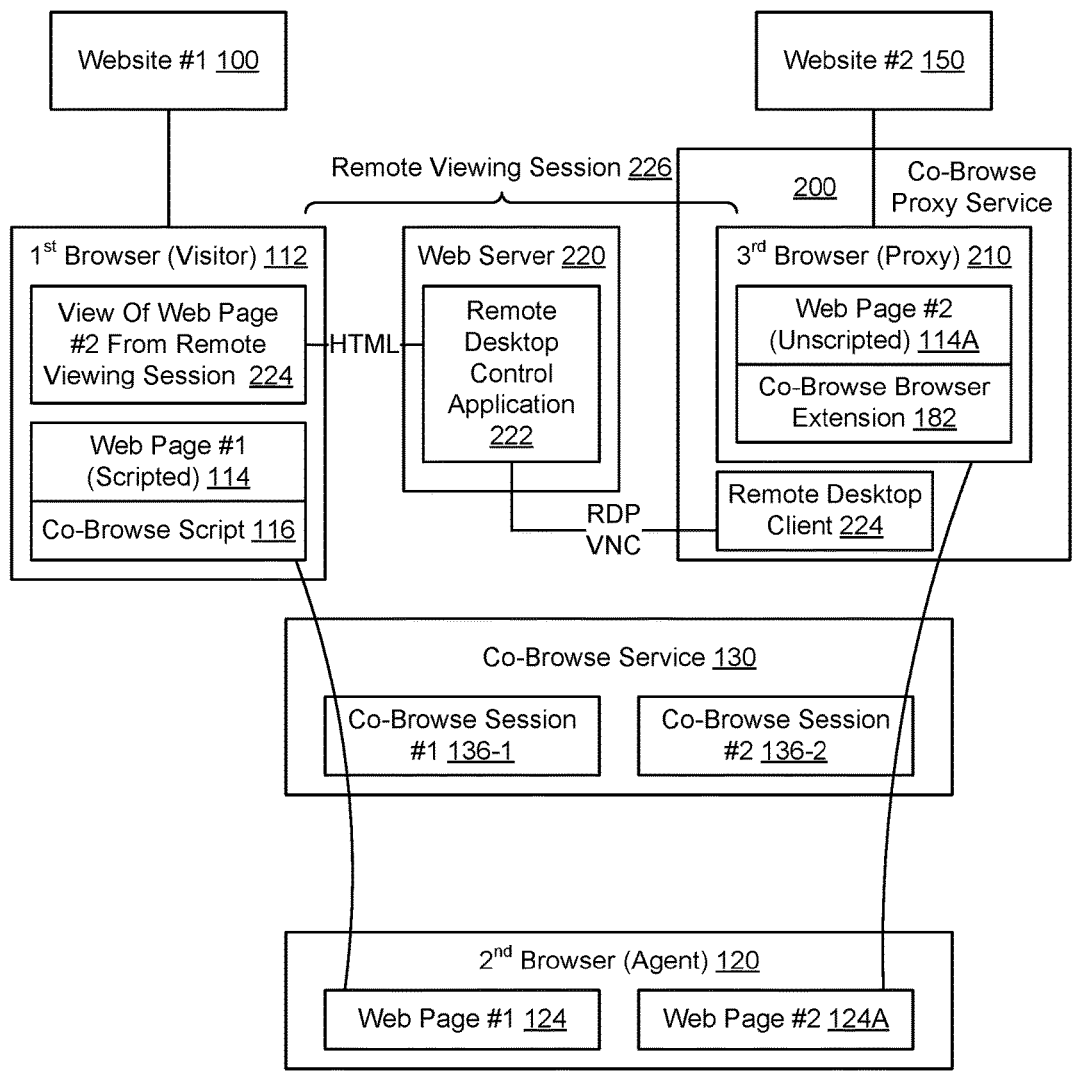
FIG. 7 is a functional block diagram illustrating the flow of information between participants to a co-browsing system to enable co-browsing of a third-party website using a proxy service.

FIG. 7 is a functional block diagram illustrating the flow of information between participants of a co-browsing system to enable co-browsing of a third-party website using a proxy service. As shown in FIG. 7, if the $1^{st}$ browser 112 is not able to load/run a browser extension, in one implementation a proxy browser 210 at a co-browse proxy service 200 may be used to browse website #2 150 on behalf of the first browser 112. The proxy browser 210, in this implementation, is instrumented with a co-browse browser extension 182 and able to script web page #2 114A from website #2 150. Proxy browser 210 is able to function in a manner similar to browser 112 as described above. This enables second browser 122 on the second computer (agent) 120 to join a co-browse session with the third browser (proxy) 210 to view web page #2 114A. First browser (visitor) 112, in this implementation, views and controls third browser (proxy) 210 using a remote viewing session 226.

In one implementation, a webserver 220 running remote desktop control application 222 interacts with remote desktop control client 224 at co-browse proxy service 200 to obtain a screen share view of $3^{rd}$ browser (proxy) 210. The screen share view of the $3^{rd}$ browser (proxy) 210 may be transmitted between the remote desktop client 224 and remote desktop control application 222 at webserver 220 via Remote Desktop Protocol (RDP) or Virtual Network Computing (VNC) protocol. Other remote desktop control protocols, such as Independent Computing Architecture (ICA) or PC-over-IP (PCoIP), or some proprietary screen sharing service, such as the Glance™ screen sharing service, may also be used depending on the implementation.

Remote desktop control application 222 converts the view of the $3^{rd}$ browser (proxy) 210 into HTML-compatible bitstream and forwards a view of web page #2 114A to $1^{st}$ browser (visitor) 112 on remote viewing session 226. Interaction by the visitor with the view of web page #2 224 on $1^{st}$ browser (visitor) 112 is redirected to remote desktop control application 222. Remote desktop control application 222 uses input from the visitor to control the $3^{rd}$ browser (proxy) 210 so that to the visitor it appears as if the web page #2 has been loaded at first browser 112. However, since $3^{rd}$ browser (proxy) 210 is able to run a browser extension 182 to add script to web page #2, it is possible for $2^{nd}$ browser (agent) 120 to co-browse web page #2 124A with the visitor.

Figure 8:
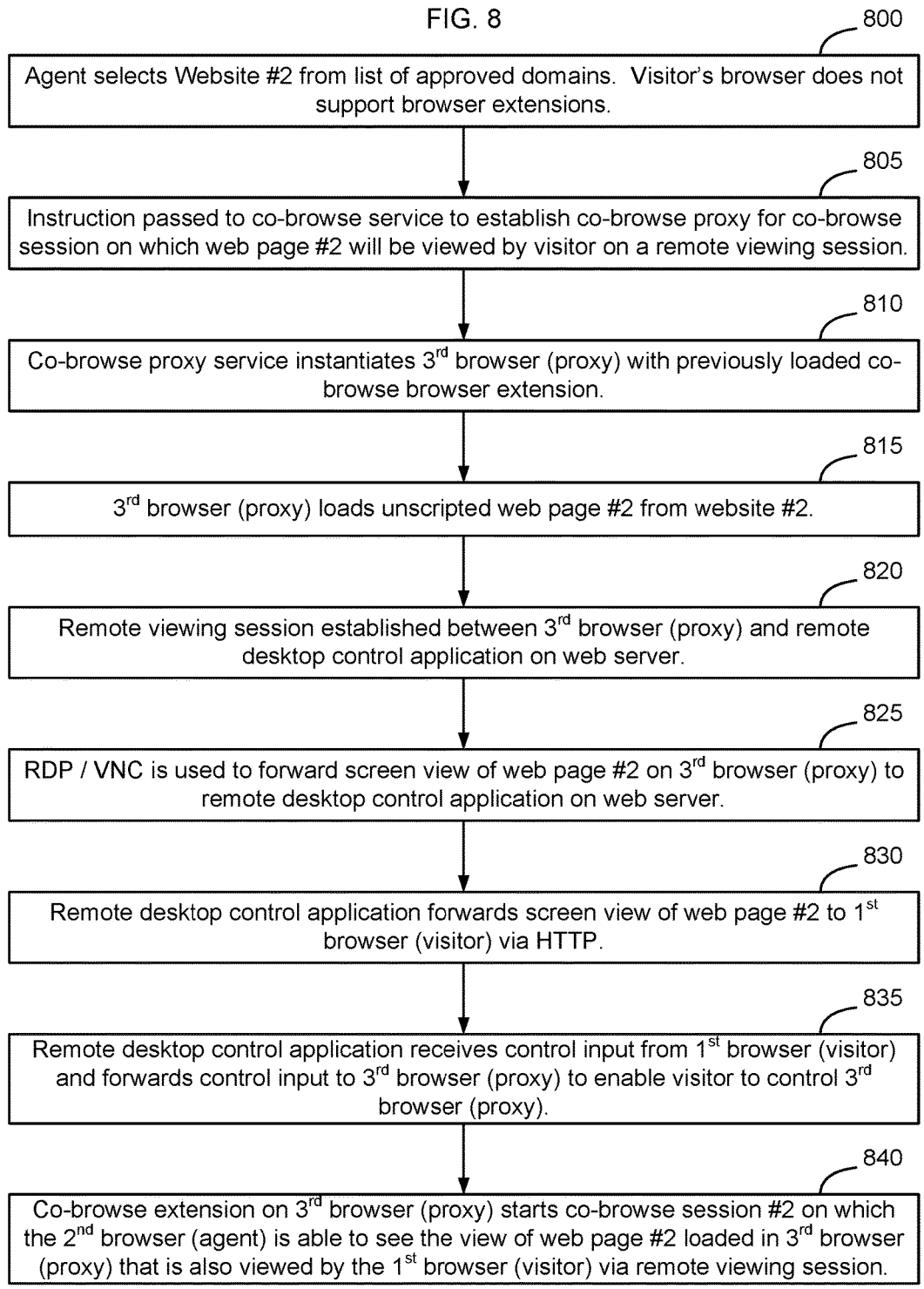
FIG. 8 is a flow chart of one implementation of enabling co-browsing of an unscripted third-party website using a proxy service hosted co-browse session of the third-party website.

FIG. 8 shows an example process of using a proxy service 200 to facilitate co-browsing of unscripted third-party websites where the $1^{st}$ browser 112 is not capable of loading a co-browsing browser extension. As shown in FIG. 8, the agent selects a website to co-browse with the visitor. In this example, the website selected by the agent is website #2. This website is selected form a list of approved domains 140 (800). Optionally, as noted above, the visitor may also initiate co-browsing of one of the third-party websites.

When agent selects a website to co-browse, instructions are passed from the agent 120 to co-browse service 130 to establish co-browse session #2 136-2 (805). Optionally, as shown in FIG. 7, if web page #1 is natively scripted with co-browse JavaScript, co-browse service 130 may previously have established a co-browse session #1 136-1 with $1^{st}$ browser (visitor) to enable agent and visitor to co-browse web page #1 of website #1.

Upon receipt of the instruction by the co-browse service 130 to establish co-browse session #2, the co-browse service sends the $1^{st}$ browser (visitor) 112 a visitor co-browse invitation as discussed above. If the visitor accepts the visitor co-browse invitation, the response to the co-browse service will include an indication of the type of browser in use at $1^{st}$ browser (visitor) 112.

When the co-browse service determines that the type of browser in use at $1^{st}$ browser (visitor) 112 is not capable of using a browser extension to implement the co-browse session, the co-browse service will respond to the browser with a link to webserver 220. Instead of using the hyperlink 174 in the authentication tag 170 of visitor co-browse invitation 160 to load web page #2 from website #2 150, $1^{st}$ browser will instead direct to webserver 220 and wait for webserver 220 to forward its view of the web page.

The co-browse service 130 also instructs co-browse proxy service 200 to initiate $3^{rd}$ browser (proxy) 210 (805). Co-browse proxy service 200 instantiates 3rd browser (proxy) with a previously loaded co-browse browser extension 182 (810). The $3^{rd}$ browser (proxy) loads unscripted third-party web page #2 114A from website #2 150 (815) and browser extension 182 is used to start co-browse session #2 on which the $2^{nd}$ browser (agent) is able to see the view of web page #2 loaded in $3^{rd}$ browser (proxy) (840).

The remote desktop client on co-browse proxy service 200 establishes a remote viewing session between the $3^{rd}$ browser (proxy) and remote desktop control application 222 on webserver 220 (820). Information on the remote viewing session between the webserver 220 and co-browse proxy service 200 may be forwarded using RDP, VNC, or some other remote desktop control protocol (825). The remote desktop control application 222 forwards screen views of the web page #2 to $1^{st}$ browser (visitor) via HTTP (830). This allows $1^{st}$ browser (visitor) 112 to view web page #2 in a normal manner with no changes required at $1^{st}$ browser. Interaction between the visitor and the $1^{st}$ browser is forwarded by the $1^{st}$ browser to webserver 220 in a standard manner and used by webserver as input to remote desktop control application 222. Remote desktop control application passes the control input from the $1^{st}$ browser over the remote viewing session 226 to the $3^{rd}$ browser (proxy) to enable the visitor to control the $3^{rd}$ browser (proxy) 210 (835).

FIG. 9 shows an example functional block diagram illustrating the flow of information between participants to a co-browsing system to enable co-browsing of a third-party website using a replication service hosted co-browse session of the third-party website.

FIG. 9 shows two co-browsing sessions—co-browse session #1 902 implemented on a scripted web page directly between the visitor and agent, and co-browse session #2 926 implemented using a replication server 928. Use of a replication server in this implementation, like the proxy-based implementation described above in connection with FIGS. 7-8, facilitates co-browsing a website between a visitor and agent where the visitor browser 910 is not compatible with the use of a browser extension.

In the example shown in FIG. 9, co-browse service 900 has established a first co-browse session 902 interconnecting a visitor computer 904 and an agent computer 906. Visitor computer 904 has loaded first web page 908 in first visitor browser 910 from website 912 in first domain 914 (arrow 901). Agent computer 906 has a first agent browser 916 in which the agent's view of the first web page 918 is displayed. Information from the first visitor browser 910 is transmitted to co-browse service 900 over co-browse session #1 902 (arrow 903) and is relayed by co-browse service 900 to first agent browser 916 on agent computer 906 (arrow 905).

Agent computer 906 has (or may retrieve from Co-Browse Service 900) a list of approved domains 920 to which the agent may initiate concurrent related co-browsing sessions. In one implementation the list of approved domains is implemented as a set of hyperlinks to websites 922 hosted by one or more second domains 924. The websites may be hosted by any domain, including first domain 914 if desired, and are not required to be scripted by co-browse JavaScript.

When the agent would like to initiate a concurrent related co-browsing session (second co-browse session 926) to a web page hosted by website 922 in domain 924, agent 906 will send a message to co-browse service 900. Rather than establishing a proxy to handle the co-browse session on behalf of the visitor, the co-browse service causes establishment of headless browser 930 at replication service 928 and joins visitor 904 and agent 906 to a co-browse session hosted by the headless browser 930.

Replication service 928 will inject co-browse JavaScript 934 into web page 932 loaded by headless browser 930 to enable the web page 932 to be co-browsed by the agent 906 and visitor 904. Since the replication service injects the co-browse JavaScript 934, e.g. using a browser extension that may be permanently incorporated in the browser used to implement headless browser 930, the web page 932 loaded from website 922 does not need to be instrumented natively. Specifically, the web page of the third-party website does not need to include co-browse JavaScript to enable the content of the web page 932 to be replicated by co-browse service 900 to agent 906 and visitor 904.

Once the web page 932 is loaded by headless browser 930, the injected JavaScript 934 starts a second related co-browse session 926 at co-browse service 900 (arrow 911). The agent 906 (arrow 913) and visitor 904 (arrow 915) join the second related co-browse session 926. On the agent computer 906, this causes a second web page 936 to be displayed in a second agent browser window 938. On the visitor computer 904, joining the second session 926 causes second web page 936 to be displayed in a second visitor browser window 940. In one implementation the second agent browser 938 opens as a new tab in the first agent browser 916, and the second visitor browser opens on the visitor computer 904 as a separate browser window rather than as a new tab in first visitor browser 910. In other implementations the second agent browser and second visitor browser 904 may open both as new tabs in the respective first agent browser 916 and first visitor browser 910.

In an implementation, the headless browser 930 instantiated by replication service 928 is the termination point for transport layer security with the second website 922. Accordingly, if traffic with website 922 is secured, that security tunnel extends between website 922 and headless browser 930, and ends at headless browser 930. If traffic is to be secured between the replication service 928 and agent/visitor, separate transport layer security instances will be implemented for these connections.

From a privacy perspective, because information shown on the headless browser is being transmitted to both the visitor and the agent on a single co-browse session, masking sensitive information at the headless browser is not feasible, since masking at that point would prevent both the visitor and the agent from seeing the information in the masked fields.

To overcome this, in one implementation, the replication server opens two headless browsers. A first headless browser implements masking and establishes a first co-browse session with the agent. The second headless browser does not implement masking and establishes a separate co-browsing session with the visitor. The DOM of the two headless browsers is identical, so that both the agent and visitor see the same view of web page 932, but by using two separate co-browse sessions with different head-end browsers, different information (masked and unmasked) is able to be passed to the agent and visitor.

In another implementation, as shown in FIG. 10, the replication server opens a headless browser 930, and the headless browser 930 opens two separate co-browsing sessions 926A, 926B with the co-browse service. In this implementation, co-browse session #2A 926A is joined by visitor's second browser 940. Co-browse session #2A 926A does not mask elements so that the $2^{nd}$ web page 936 loaded in visitor's second browser 940 contains visible content of all elements of web page 932. Co-browse session #2B 926B is joined by agent second browser 938. The headless browser masks elements on co-browse session #2B 926B using a list of masked web page elements 935 to prevent the agent from having access to confidential visitor information contained in selected objects of web page 932.

In yet another implementation, privacy concerns relating to display of visitor information to the agent may be accomplished by locally masking a set of fields at the agent browser 938. Sensitive information from the visitor, such account numbers and login information, may be present at the headless browser 930 but, by locally masking these fields at the agent browser 938, the agent is prevented from viewing this information. In one implementation the visitor sensitive information is deleted and overwritten at the replication service to prevent the visitor sensitive information from being residually stored at the replication service. At the agent, similarly, any visitor sensitive information stored locally (such as in cookies at the agent browser 938) is deleted and overwritten to prevent the visitor sensitive information from persisting at the agent 906.

Figure 11:
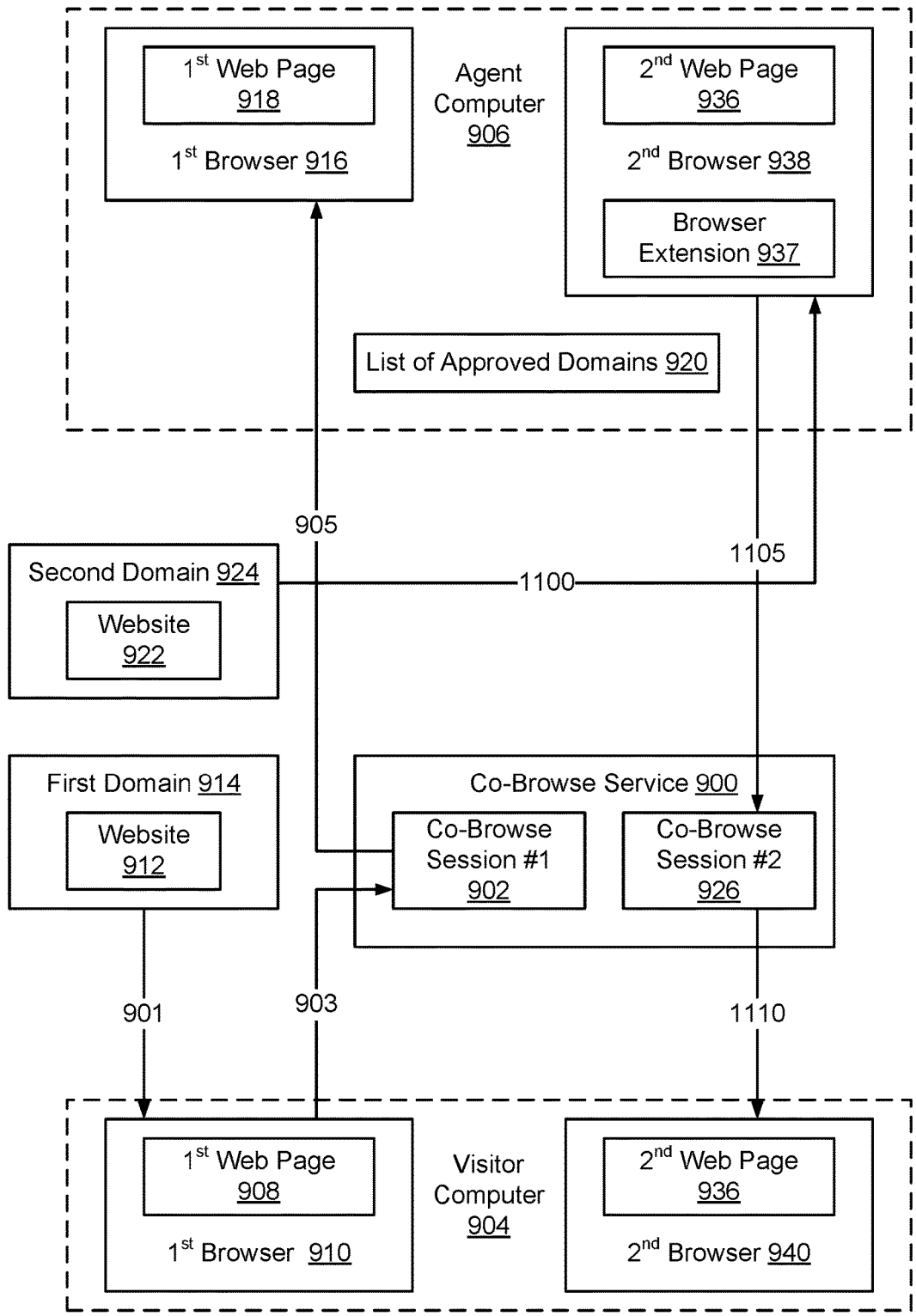
FIG. 11 is a functional block diagram illustrating the flow of information between participants to a co-browsing system to enable co-browsing of a third-party website using an agent-hosted co-browse session of the third-party website.

In another implementation, as shown in FIG. 11, instead of using a proxy service or a replication service, the agent 906 starts a co-browse session 926 that is joined by the visitor 904 when the visitor is unable to install a browser extension to co-browse a third-party website. In this implementation, the agent 906 opens a browser 938 incorporating a co-browse browser extension to the authorized website. The browser 938 loads second web page 936 (arrow 1100). A co-browse session (session 926) is started via co-browse service 900. Co-browse script in browser extension 937 on agent computer thus provides updates on the co-browse session to the co-browse service 900 (FIG. 11 arrow 1105) which are forwarded to the visitor (FIG. 11 arrow 1110).

In this implementation, since the agent browser is interacting with the second website 922, a security concern may arise since any visitor login credentials and other sensitive visitor information would need to be transmitted on the co-browse session through the agent computer. While masking might be implemented to prevent the agent from seeing the visitor credentials, any first party cookies stored on the agent's machine may capture the login credentials rendering this solution potentially unsecure. Accordingly, this implementation takes care to ensure residual retention of visitor login information and other sensitive visitor information is not visible at the agent computer and is not retained in any way at the agent computer, such as by deleting all session data and first party cookies written by third-party website, and overwriting any objects that may contain visitor confidential information.

In the implementation shown in FIG. 11, the agent may obtain permission from the visitor to co-browse website 922 using a mechanism similar to the mechanism described above in connection with FIG. 4. For example, in one implementation, the agent selects a web site for third-party co-browse, just as in 405 (see FIG. 4). The co-browse service presents an invitation to the visitor and the session proceeds as in 410, 415, 420, and 425. Thereafter, instead of having a browser extension downloaded to the visitor browser, the agent opens a new browser or browser window and loads the third-party website (arrow 1100). The agent browser already includes a co-browse browser extension 937 that initiates co-browse session #2 926 that is joined by visitor computer.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more non-transitory tangible computer-readable storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), cache, optical or magnetic disk, Redundant Array of Independent Disks (RAID), floppy drive, CD, DVD, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled, interpreted, or otherwise processed. For example, some JavaScript engines contain smart just-in-time compilers that compile appropriate subsets of the application programs transparently to their users. The invention is not limited to any particular implementation.

As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), tablet or handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although an embodiment has been described in which the browser extension 182 and co-browse script 116 are described as being implemented using JavaScript, other forms of scripting language may be utilized as well. For example, JavaScript is an implementation of a scripting language standard by ECMA International in the ECMA-262 specification. Other implementations of this standard include JScript and ActionScript. Thus, although an implementation was described in which JavaScript is used, the invention is not limited to this particular implementation as other forms of script may be used as well.

For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Although the methods and systems have been described relative to specific embodiments thereof, they are not so limited. Many modifications and variations may become apparent in light of the above teachings. Many additional changes in the details, materials, and arrangement of parts, herein described and illustrated, may be made by those skilled in the art. A number of implementations have been described.

Nevertheless, it will be understood that additional modifications may be made without departing from the scope of the inventive concepts described herein, and, accordingly, other implementations are within the scope of the following claims.

What is claimed is:

1. A method of enabling co-browsing of third-party websites, the method comprising the steps of:
    receiving, by a recipient computer, a co-browsing invitation from a co-browsing service, the co-browsing invitation including a co-browsing authentication tag and an object to receive an indication of acceptance by a recipient computer of the co-browsing invitation, the co-browsing authentication tag includes an authentication token, a hyperlink to a target website of the co-browsing invitation, a whitelist of authorized target web sites, and a link to a co-browsing browser extension;
    receiving, by the object, the indication of acceptance;
    forwarding, by the recipient computer, the authentication token to an authentication service for verification;
    if the authentication token is verified by the authentication service, downloading and installing the co-browsing browser extension into a browser at the recipient computer; and
    establishing, by a browser on the recipient computer, a first co-browsing session on a natively scripted website prior to the steps of receiving the co-browsing invitation and forwarding the authentication token, the natively scripted website including co-browse script that is downloaded into a browser of the recipient computer when the website is loaded by the browser, the co-browse script causing the recipient computer to forward a Document Object Model (DOM) describing the content displayed in the browser to the co-browse service;
    wherein the co-browsing browser extension is software that is installed directly into a browser at the recipient computer and not into an operating system controlling operation of the recipient computer, the co-browsing browser extension is certified by a company that created the browser, and the co-browsing browser extension contains script to capture a Document Object Model (DOM) of the browser when the browser loads a website included in the whitelist of authorized target websites.

2. The method of claim 1, wherein the script of the co-browsing browser extension will not examine, manipulate, modify, or transmit the DOM of the browser when the browser loads a website not included in the whitelist of authorized target websites.

3. The method of claim 1, wherein the co-browsing browser extension is software that is automatically uninstalled becomes non-operational when the co-browse session ends or the browser is closed.

4. The method of claim 1, wherein the authentication token is a cryptographically secure expiring token, and wherein the authentication service is a co-browsing service.

5. The method of claim 1, wherein the co-browsing browser extension is a certified software package signed by a company that created the browser at the recipient computer the method further comprising the step of downloading the co-browsing browser extension from the co-browsing service.

6. The method of claim 1, wherein the co-browsing service is hosting a first co-browsing session for the recipient computer on a first website in a first domain during the steps of generating the co-browsing invitation and forwarding the co-browsing invitation to the recipient computer, the invitation being an invitation to participate in a second separate co-browsing session on a second website in a second domain or to extend the scope of the first co-browsing session to include the second website.

7. The method of claim 1, further comprising downloading and installing the co-browsing browser extension, the co-browsing browser extension containing script to capture a Document Object Model (DOM) of the browser when the browser loads a website that is not natively scripted with co-browse script;
    loading, by the browser, the target website; and
    establishing, by the browser, a second co-browsing session using the script of the co-browsing browser extension or extending the scope of the first co-browsing session to include the second website, the co-browsing browser extension causing the recipient computer to forward the DOM of the browser as the browser interacts with the target web site.

* * * * *